United States Patent [19]

Kozuki et al.

[11] Patent Number: 4,785,360
[45] Date of Patent: Nov. 15, 1988

[54] RECORDING AND REPRODUCING APPARATUS HAVING TRACKING CONTROL RESPONSIVE TO ERASE HEAD SCANNING

[75] Inventors: Susumu Kozuki, Tokyo; Hiroyuki Takimoto; Mitsuhiro Otokawa, both of Yokohama; Hiroo Edakubo, Akishima; Kenichi Nagasawa, Kawasaki; Keiji Satoh, Tokyo, all of Japan

[73] Assignee: Canon Kabushiki Kaisha, Tokyo, Japan

[21] Appl. No.: 914,371

[22] Filed: Oct. 2, 1986

[30] Foreign Application Priority Data

Oct. 7, 1985 [JP] Japan .................. 60-222002

[51] Int. Cl.⁴ .......................................... G11B 15/087
[52] U.S. Cl. ........................................ 360/77; 360/78
[58] Field of Search ................. 360/70, 73, 77, 78

[56] References Cited

U.S. PATENT DOCUMENTS 4,663,673 5/1987 Doutsubo ..................... 360/73

FOREIGN PATENT DOCUMENTS 53-96805 8/1978 Japan ........................... 360/77
54-22810 2/1979 Japan ........................... 360/73

Primary Examiner—Raymond F. Cardillo
Assistant Examiner—David L. Robertson
Attorney, Agent, or Firm—Robin, Blecker & Daley

[57] ABSTRACT

In an information signal recording and reproducing apparatus arranged to record in rotation pilot signals of a plurality of kinds having different frequencies, one in each of recording tracks along with an information signal on a recording medium and to reproduce the information signal from the recording medium, the relative positions of a rotary head which is reproducing the information signal and the recording medium are controlled by using the pilot signals reproduced by the rotary head and reference signals of a plurality of kinds which are of different frequencies corresponding respectively to the pilot signals of the plurality of kinds and are generated in rotation; and the generating sequence of these reference signals is changed by skipping a given number of reference signals according to signals reproduced by a rotary erase head during a reproducing operation.

12 Claims, 5 Drawing Sheets

RECORDING AND REPRODUCING APPARATUS HAVING TRACKING CONTROL RESPONSIVE TO ERASE HEAD SCANNING

BACKGROUND OF THE INVENTION

1. Field of the Invention

This invention relates to an information signal recording and reproducing apparatus and more particularly to an apparatus of the kind arranged to record in rotation pilot signals of a plurality of kinds having different recording frequencies, in respective different recording tracks, along with an information signal on a recording medium and to reproduce the information signal from the recording medium.

2. Description of the Related Art

The conventional recording and reproducing apparatuses of the above-stated kind include, for example, a video tape recorder (hereinafter referred to as VTR) of a helical scanning type which is arranged to perform tracking control during reproduction by the so-called four-frequency method. The manner in which tracking control signals have been obtained in accordance with the four-frequency method is as briefly described below with reference to the accompanying drawings. FIG. 1 shows magnetic recording tracks formed by the VTR of the type performing tracking control by the four-frequency method. FIG. 2 shows in a block diagram the essential circuit arrangement required for obtaining a tracking error signal. In FIG. 1, an arrow 2 indicates the direction in which a magnetic tape 1 is to be moved. Recording tracks A1, B1, A2, B2, --- are formed during recording by heads A and B which have different azimuth angles. An arrow 3 indicates the scanning direction of these heads. In the recording tracks which as a whole denoted by a reference numeral 4 are recorded, along with a video signal, pilot signals of four different frequencies f1 to f4. One of the pilot signals is recorded for every field of the video signal, that is, in each of the tracks in rotation. The sequence in which the pilot signals are recorded is as shown in FIG. 1. For example, the pilot signal of frequency f1 which is 102.5 KHz=6.5 fH (fH: the frequency of a horizontal synchronizing signal) is recorded in the recording track A1; the pilot signal of frequency f2 which is 118.9 KHz=7.5 fH is recorded in the track B1; the pilot signal of frequency f3 which is 165.2 KHz=10.5 fH in the track A2; and the pilot signal of frequency f4 which is 148.7 KHz=9.5 fH in the track B2. These pilot signals are recorded in a state of being superimposed on a video signal. The frequency difference between the pilot signals recorded in adjacent recording tracks is either fH or 3 fH as shown in FIG. 1. When the head is scanning the tracks Ai (i: 1, 2, 3, ---), the frequency difference is always fH between the pilot signal of the track being mainly scanned and that of the adjoining track on the right-hand side and always 3 fH between the pilot signal of the mainly scanned track and that of another track adjoining on the left-hand side. Further, when the head is scanning the tracks Bi (i: 1, 2, 3,---), the frequency difference is always 3 fH between the pilot signal of the mainly scanned track and that of the track adjoining on the right-hand side and always fH between the pilot signal of the mainly scanned and that of another adjoining track on the left-hand side.

Since the frequencies f1 to f4 of the pilot signals are relatively low, the pilot signals recorded in the adjacent tracks other than the mainly scanned track can be reproduced by the head as cross-talks even in the event of azimuth recording. Assuming that the head is mainly scanning the track A2, the pilot signal thus detected is a composite signal including components of frequencies f4, f2 and f3. In case that the center of the tracing locus of the head precisely coincides with the center line of the track which is mainly scanned under the tracking control, i.e. in the case of an on-track state, the pilot signals (of frequencies) f2 and f4 of the neighboring tracks are reproduced at even levels. However, the level of the frequency component f4 becomes higher than that of the other frequency component f2 when the position of the head slightly deviates from the center line of the track A2 toward the track B2 and lower than that of the component f2 when the position of the head deviates toward the track B1.

Therefore, the deviating direction and the deviating degree of the head from the mainly scanned track are obtainable by separately taking out the difference signals which represent the frequency differences fH and 3 fH between the pilot signals recorded in the mainly scanned track and the two neighboring tracks respectively and by comparing the levels of these two difference signals.

FIG. 2 shows in a block diagram the circuit arrangement of the VTR operating by the four-frequency method described above. Referring to FIG. 2, a reproduced signal consisting of a video signal which is reproduced by a rotary reproducing head and the pilot signals which are superimposed on the video signal comes from a terminal 5 to a low-pass filter (LPF) 6. The LPF 6 then separates the pilot signal component from the incoming reproduced signal. A multiplier 8 is arranged to perform a multiplying operation on the pilot signal component thus separated and a local pilot signal which is a reference signal generated by a local pilot signal generating circuit 7. The circuit 7 is arranged to produce a pilot signal or reference signal of the same frequency as that of the pilot signal recorded in the mainly scanned track. Then, as mentioned above with reference to FIG. 1, the output of the LPF 6 includes the frequency components f2, f4 and f3 with the track A2 assumed to be mainly scanned. In that event, the local pilot signal has the frequency f3. Therefore, the multiplier 8 produces a signal having frequencies representing the sum of and difference between the frequency f3 and the frequency components f2, f4 and f3. A bandpass filter (BPF) 9 is arranged to take out only a signal of frequency fH from the sum and difference signal while another BPF 10 is arranged to take out a signal of frequency 3 fH. The outputs of these BPFs are supplied to detection circuits 11 and 12 for detection and rectification.

The signal components fH and 3 fH which are thus obtained are then supplied to a level comparison circuit 13. The circuit 13 then produces a signal representing a level difference between these signal components. More specifically, when the reproduced level of the signal fH is higher than that of the signal 3 fH, a positive potential corresponding to the level difference is obtained. A negative potential is obtained in the opposite case. By this, a signal including information on the track deviating degree and the track deviating direction of the head is produced and can be used as a tracking error signal.

Under this condition, the relation between the deviating direction and the tracking error signal obtained for the track Ai becomes reverse to the relation obtained for the track Bi as mentioned in the foregoing with reference to FIG. 1. To solve this problem, therefore, a switching circuit 16 is arranged behind the level comparison circuit 13 to have the output put of the comparison circuit 13 selectively produced either through an inverting amplifier 14 or not through the amplifier 14 in accordance with a head switch-over signal 15.

In the conventional method of accomplishing tracking control by means of the pilot signals of four different frequencies as described above, the relation of the tracking error signal to the track deviating position of the head becomes as shown in FIG. 3. FIG. 3 shows the position of the head on the tape in the direction perpendicular to the recording tracks in relation to the level of the tracking error signal. In FIG. 3, a point T0 represents the position of the head when the head is normally tracing a track under control. Points T1, T2, T3 and T4 represent the head positions deviating respectively by one track pitch one after another. The axis of ordinate indicates the output of a terminal 17 (of FIG. 2) obtained at each of the points T0 to T4, that is, the level of the tracking error signal.

Assuming that the track pitch is approximately equal to the width of the head, the output of the terminal 17 which is the tracking error signal is zero at the point T0. This indicates that the tracking control is correctly performed on the reproducing head. However, if the tracking position of the reproducing head comes to deviate in the positive direction, the degree of tracking deviation increases showing a positive inclination until it reaches one track pitch, i.e. the point T1 representing the neighboring track. The deviating degree reaches a maximum value at the point T1. After that, the tracking error signal which is produced from the terminal 17 decreases showing a negative inclination according as the deviating degree further increases within the range of a two track-pitch distance (or between the points T1 and T3. During this process of level decrease of the tracking error signal, the level of the signal becomes zero at the point T2 which indicates deviation by a two track-pitch distance. After this point, the tracking error signal comes to be of a negative level. It reaches a minimum negative value at the point T3 which indicates deviation by a three track-pitch distance. When the tracking deviation degree comes to exceed the three track-pitch distance, the level of the tracking error signal again begins to increase showing a positive inclination and becomes zero at the point T4. In this manner, the level of the tracking error signal makes one cycle of changes while the tracking deviation increases from the point T0 to the point T4. This cycle is repeated according as the tracking deviation further increases.

While the tracking error signal is changing in this manner, the tracking control system is arranged to control the position of the reproducing head and that of the recording medium relative to each other to lessen the tracking position deviation when the level of the tracking error signal comes to increase in the positive direction at the point T0. It also controls the relative positions of the head and the medium to lessen the deviation when the error signal comes to decrease in the negative direction. Under this control, the reproducing head is eventually locked in position at the point T0 where the level of the tracking error signal becomes zero. Meanwhile, the level of the tracking error signal becomes zero also at another phase point T2. Then, if the level of the tracking error signal increases in the positive direction or decreases in the negative direction from the point T2, the relative positions of the reproducing head and the recording medium would be controlled in such a way as to enlarge the deviating degree. Therefore, this point T2 never becomes a stabilizing point.

In the conventional apparatus of the kind described, there are two points at which the level of the tracking error signal becomes zero within every four track-pitch distance. Although the reproducing head accurately traces the track under control at one of the two points, the head deviates to the extent of a two track-pitch distance at the other point, which never can be a stabilizing point. However, since the tracking error signal also comes to the zero level also at the latter point, it takes an excessively long time in bringing the head back to the former point which is a stabilizing point.

SUMMARY OF THE INVENTION

It is a general object of this invention to solve the above-stated problem.

It is a more specific object of this invention to provide an information signal recording and reproducing apparatus which is capable of stabilizing with great speed the tracking control operation of the apparatus.

Under this object, an information signal recording and reproducing apparatus arranged according to this invention as an embodiment thereof to record in rotation pilot signals of a plurality of kinds having different frequencies, in respective different recording tracks, along with an information signal on a recording medium and to reproduce the information signal from the recording medium comprises: a first rotary head arranged to reproduce the information signal; a second rotary head arranged to erase the information signal on the recording medium; reference signal generating means arranged to generate in rotation reference signals of a plurality of kinds having different frequencies corresponding to those of the pilot signals; control means for controlling the relative positions of the first rotary head and the recording medium by using the reference signals generated by the reference signal generating means and the pilot signals reproduced by the first rotary head; and skipping means for causing the reference signal generating means to change the reference signal generating rotation sequence thereof by skipping a given number of reference signals according to the pilot signals which are reproduced by the second rotary head.

The above and further objects and features of this invention will become apparent from the following detailed description of the embodiments thereof taken in connection with the accompanying drawings.

DETAILED DESCRIPTION OF THE PREFERRED EMBODIMENTS

Figure 1:
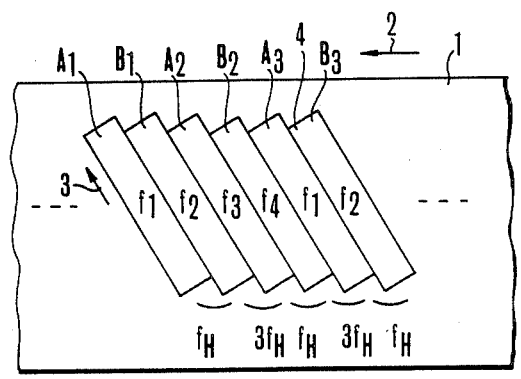
FIG. 1 shows magnetized recording tracks formed by the conventional VTR arranged to perform tracking control by the four-frequency method.
Figure 4:
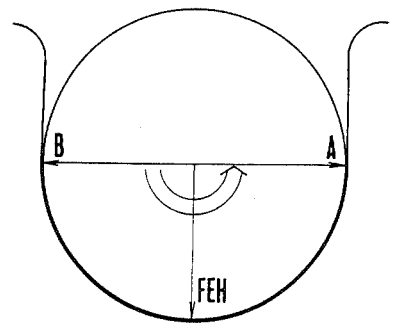
FIG. 4 is a schematic illustration of the head arrangement of a VTR which is arranged according to this invention as an embodiment thereof.

The head arrangement of a VTR which is provided with a rotary erase head (FEH) and is arranged according to this invention as an embodiment thereof is as described below with reference to FIGS. 4, 5 and 6:

FIG. 4 shows the head arrangement and the rotation phases of the heads of the embodiment. As shown, recording and reproducing heads A and B are arranged on a rotary drum to be opposed to and away from each other at an angle of 180 degrees. The rotary erase head (hereinafter referred to as FEH for short) is also arranged on the same rotary drum to follow the head A with a phase difference of 90 degrees from it in the rotating direction and to precede the head B also by 90 degrees in the rotating direction. The head widths and the relative mounting heights of these heads A and B and the FEH are as shown in FIG. 5. As shown, the recording and reproducing heads A and B have widths WA and WB which are slightly wider than the width TW of the recording tracks. The FEH has a width WFE which is at least twice as wide as the track width TW. During recording, the heads A and B which are of different azimuth angles alternately form recording tracks in the order of B0, A1, B1, A2, B2, A3, B3, A4 --- one after another. Then, pilot signals of different frequencies f1, f2, f3 and f4 are recorded along with an information signal as described in the foregoing with reference to FIG. 1.

Figure 5:
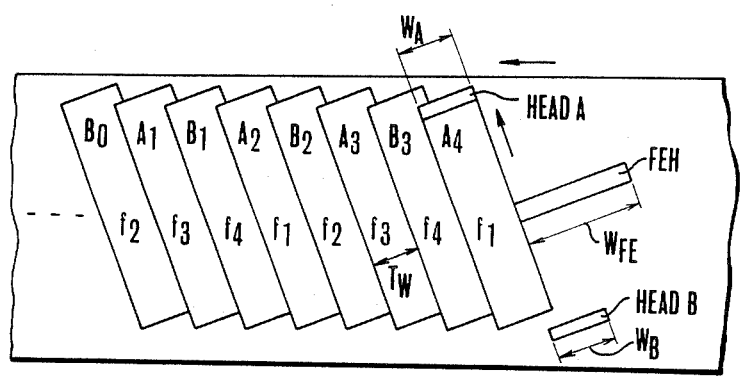
FIGS. 5 and 6 show the tracing positions on a magnetic tape of heads shown in FIG. 4.

FIG. 5 shows the head A as in a state of just having completed a recording tracing action on the track A4 and the head B as in a state immediately before going to trace a next track B4 (not shown) for recording. While the heads A and B are in these tracing positions, the FEH is located at an intermediate point between the heads A and B and is receiving a signal for erasing. In response to the erasing signal, the FEH erases any existing record from the tracks in which the heads A and B are going to record signals. Therefore, the mounting height of the FEH relative to other heads A and B is adjusted to have the left end of the FEH located further rightward than the width WA of the track A4 in such a way as to ensure that the track A4 which has newly been recorded remains unaffected by the erasing action of the FEH.

Figure 6:
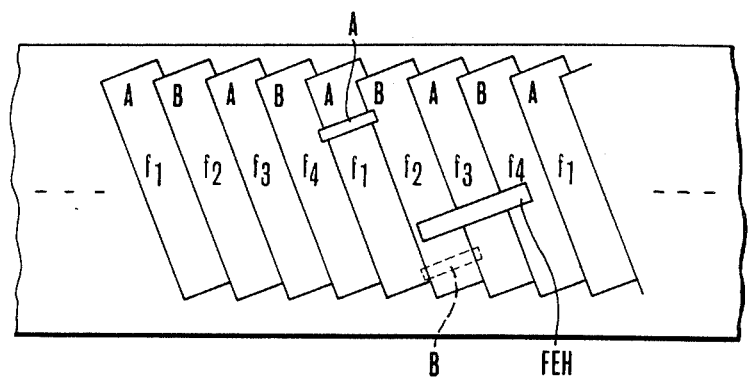

FIG. 6 shows by way of example the track tracing states of these heads during a reproducing operation. If the FEH is in a reproducing mode while the head A is accurately tracing (just tracking) a recording track A in which the pilot signal (of frequency) f1 is recorded, the FEH detects pilot signals f2, f3 and f4 from the adjoining track B in which the pilot signal f2 is recorded, from a further adjoining track A in which the pilot signal f3 is recorded and from another track B in which the pilot signal f4 is recorded. In the meantime, the pilot signal f1 which is recorded in the track A being traced by the head A is not detected. Further, with the FEH arranged as shown in FIG. 6, the levels at which the pilot signals f2 and f3 are detected are higher than the detection level of the pilot signal f4. The FEH is in the same tracing condition while the other head B is tracing the track B in which the pilot signal f2 is recorded in the next field of the video signal as indicated by a broken line in FIG. 6.

Further, when the head A is tracing the track A in which the pilot signal f3 is recorded in a just tracking state, the pilot signals detected by the FEH are f1, f4 and f2. The detected levels of the pilot signals f4 and f1 are higher than that of the pilot signal f2.

Figure 2:
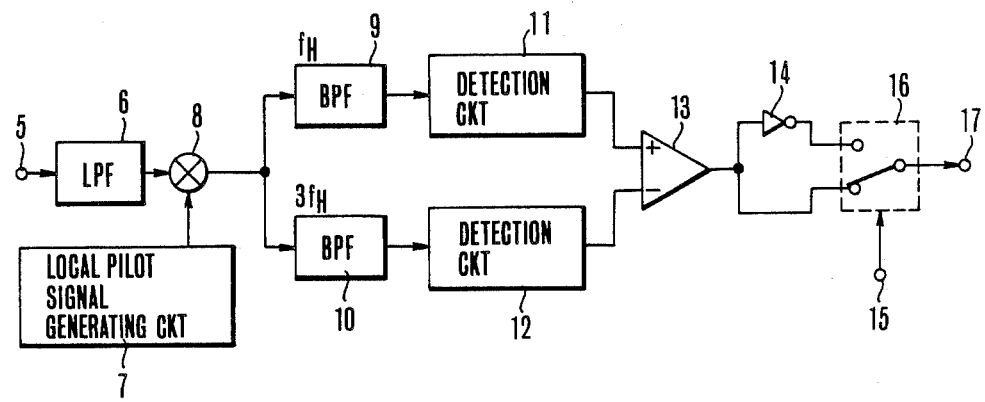
FIG. 2 is a circuit diagram showing the conventional circuit arrangement made for obtaining a tracking error signal by the four-frequency method.
Figure 3:
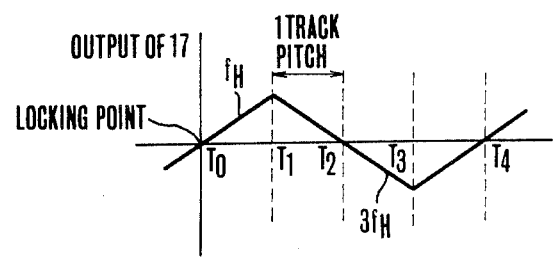
FIG. 3 is a graph showing the position of a head on a tape in the direction perpendicular to the recording tracks as in relation to the level of the tracking error signal.
Figure 7:
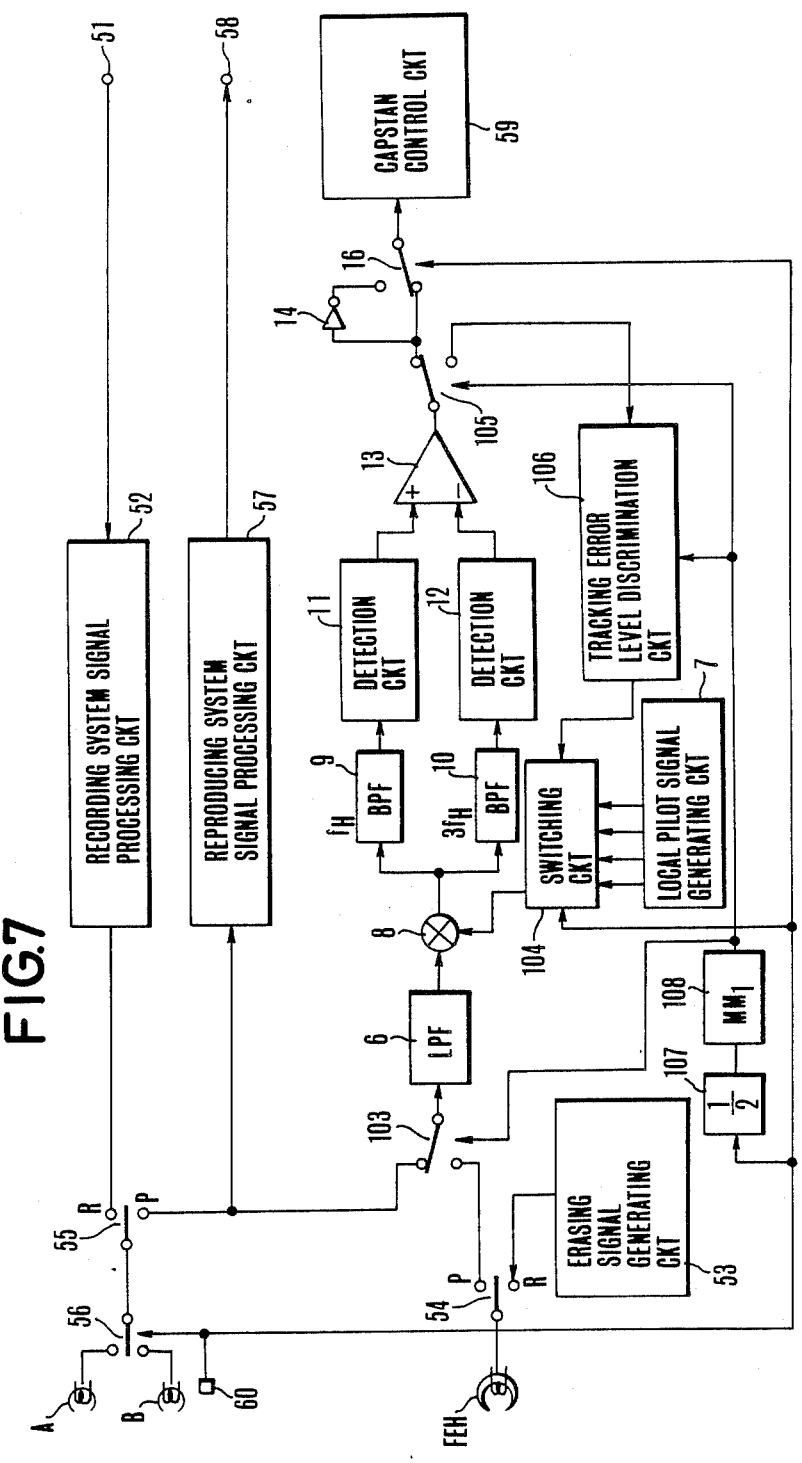
FIG. 7 is a block diagram showing the arrangement of the VTR embodying this invention.

FIG. 7 shows in a block diagram the arrangement of the essential part of the VTR as the embodiment of this invention. In the VTR, the FEH has a head width which is at least as wide as a two track-pitch length and is disposed in between the heads A and B which are arranged with a 180° phase difference between them and have different azimuth angles as shown in FIGS. 4 and 5. In FIG. 7, the same component elements as those shown in FIG. 2 are indicated by the same reference numerals.

Referring to FIG. 7, an input terminal 51 is arranged to receive a video signal to be recorded. A recording system signal processing circuit 52 is arranged to process the incoming video signal into a signal form suited for magnetic recording. A circuit 53 is arranged to generate an erasing signal. During a recording operation, the connecting positions of switches 54 and 55 are on their sides R to allow the video signal produced from the signal processing circuit 52 to be recorded on a magnetic recording tape alternately by the heads A and B. A rotation phase detector 60 is arranged to detect the rotation phases of the heads A and B and to generate a head change-over signal of 30 Hz (hereinafter referred to as 30 PG signal). A head change-over switch 56 is arranged to operate under the control of this 30 PG signal. Upon receipt of the erasing signal via the terminal on the side R of the switch 54, the FEH erases any existing record on the magnetic tape prior to recording by the heads A and B.

During a reproducing operation, signals reproduced by the heads A and B are alternately produced by the change-over switch 56. The output of the switch 56 is supplied via the terminal on the side P of the switch 55 to a reproducing system signal processing circuit 57. The signal processing circuit 57 processes the reproduced video signal back into a signal form suited for reproduction on some external monitor or the like. The processed video signal is then supplied to a terminal 58.

Tracking control is carried out during reproduction in the following manner: Again referring to FIG. 7, the VTR is provided with a change-over switch 103; a local pilot signal switching circuit 104 which includes a known logic gate arrangement, etc. operating by utilizing the above-stated 30 PG signal; a change-over switch 105; a tracking error level discrimination circuit 106; a frequency divider 107; and a monostable multivibrator (MM1) 108. With the VTR arranged in this manner, the reproduced signal obtained from the heads A and B and the reproduced signal obtained by the FEH are selectively supplied by the change-over switch 103 to an LPF 6. Further, a know circuit is formed jointly by a multiplier 8; a BPF 9 which is arranged to separate a frequency component fH; another BPF 10 arranged to separate a frequency component of 3 fH; detectors 11 and 12; a comparison circuit 13; and so on. The multiplier 8 is arranged to perform a multiplying operation on the pilot signal component reproduced and one of local pilot signals of frequencies f1 to f4 which are generated as reference signals from the local pilot signal generating circuit 7. In other words, one of the local pilot signals selected by the local pilot signal switching circuit 104 is multiplied by the reproduced pilot signal. Meanwhile, the output terminal of the above-stated comparison circuit 13 is connected to a change-over switch 105 which is arranged to operate in association with the change-over switch 103. The output from one terminal of the switch 105 is supplied to an inverting amplifier 14 and a switching circuit 16 which operates according to the 30 PG signal. Then, a voltage representing a tracking error is supplied to a capstan control circuit 59. Further, the output of the other terminal of the change-over switch 105 corresponds to a signal reproduced by the FEH and is arranged to be supplied to the tracking error level discrimination circuit 106.

Figure 8:
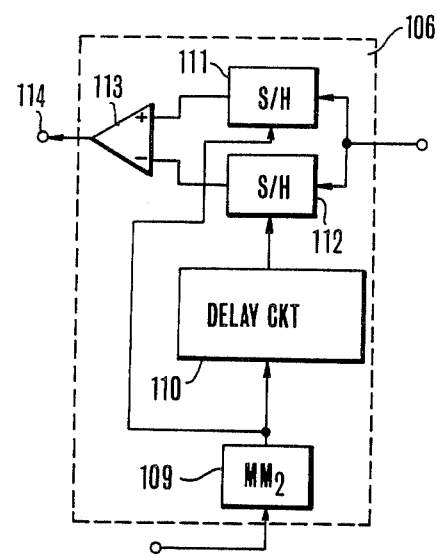
FIG. 8 is a diagram showing by way of example the details of arrangement of a tracking error level discrimination circuit shown in FIG. 7.

FIG. 8 is a block diagram showing by way of example the details of the tracking error level discrimination circuit 106 which discriminates the level of the tracking error detected by the FEH. The circuit 106 includes a monostable multivibrator (MM2) 109; a delay circuit 110; sample-and-hold circuits (S/H) 111 and 112; a comparator 113; and an output terminal for supplying the output of the circuit 106 to the switching circuit 104. This tracking error level discrimination circuit 106 and the above-stated change-over switches 103 and 105 are arranged to operate under the control of control pulses obtained from the above-stated 30 PG signal.

Figure 9:
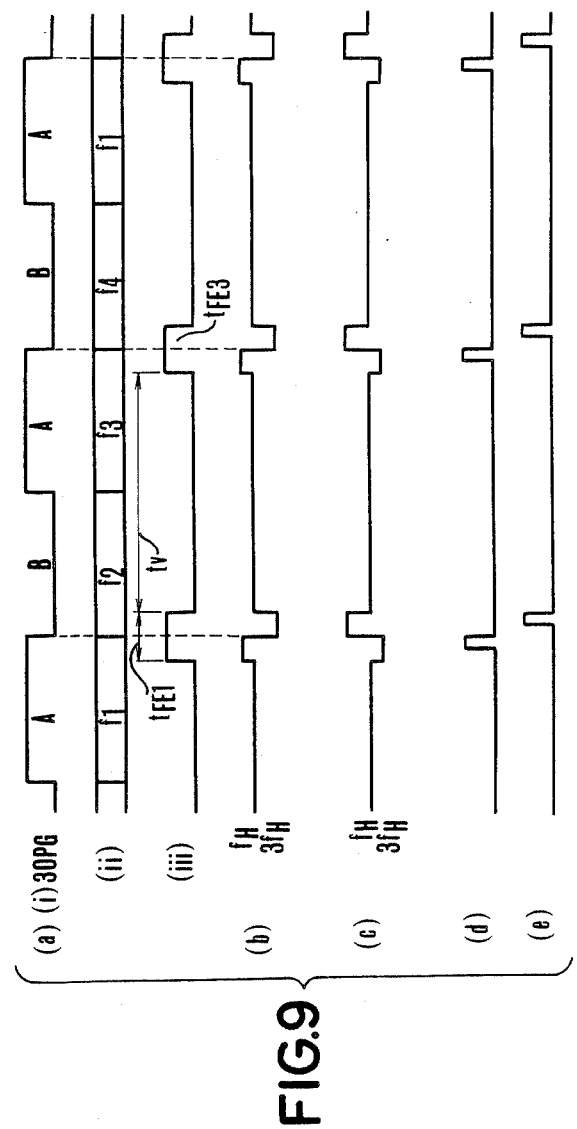
FIG. 9 is a timing chart showing the wave forms of the outputs of various parts shown in FIGS. 7 and 8.

FIG. 9 is a timing chart showing the signal forms of the various parts shown in FIGS. 7 and 8. Referring to FIG. 9, a part (a)(i) shows the abovestated 30 PG signal. The control pulses which are as shown at another part (a)(iii) are obtained from this 30 PG signal by means of a frequency divider 107 which is arranged to frequency divide the 30 PG signal by ½ and set the monostable multivibrator 108. A part (a)(ii) shows the pilot signals recorded in the recording tracks to be controlled. Referring to the part (a)(iii), the connecting position of the change-over switch 103 is shifted to one side FEH thereof during a period tFE. Then, the connecting position of the change-over switch 105 is shifted to its side for the tracking error level discrimination circuit 106 to permit use of the output of the level omparison circuit 13 for controlling the level discrimination circuit 106.

During an ensuing period tv, the position of the switch 103 shifts to the other side for the heads A and B to allow the output of the level comparison circuit 13 to be used for tracking control. Assuming that the local pilot signal of the frequency f1 is used for the multiplying operation for the output of the head A with the heads in the state of FIG. 6 and that the head A is close to the just tracking state, the FEH is reproducing the recorded pilot signals of frequencies f2 and f3 together with a smaller amount of the frequency f4 during the period tFE1 shown in FIG. 9. During the first half of the period tFE1, i.e. while the head A is performing a reproducing action, the local pilot signal for the output of the FEH is of the frequency f1. During the latter half of the period tFE1, i.e. while the other head B is performing a reproducing action, the local pilot signal to be used for the output of the FEH is of another frequency f2. Therefore, the tracking error voltage thus obtained contains the component of frequency fH in a greater amount in the first half period and the component of 3 fH in a greater amount, that is, a negative voltage is produced in the latter half period as shown at a part (b) in FIG. 9.

However, in case that the head position is not in the above-stated just tracking state but is deviating to an extent which is more than a one track-pitch distance and is near to a two track-pitch distance and that the head position is close to the above-stated false stabilizing point, the local pilot signal of, for example, the frequency f1 or f2 would be erroneously selected while the pilot signal of frequency f1 or f2 is mainly reproduced by the head A or B as shown in FIG. 6. In that case, the tracking error voltage obtainable from the head A or B becomes zero. Meanwhile, however, the tracking error voltage derived from the FEH in such a case becomes as shown at a part (c) of FIG. 9. As shown, the error voltage has the component of 3 fH in a greater amount thus showing a negative voltage in the first half of the period fFE and the other component fH in a greater amount showing a tendency of giving a positive voltage in the latter half of the period tFE.

Therefore, with the tracking error voltage which is derived from the FEH arranged to be detected during the period tFE which recurs once in every two-field period of the video signal, the arising tendency of the tracking error voltage, i.e. from a positive voltage toward a negative voltage or from a negative voltage toward a positive voltage is detected by using the tracking error voltage thus detected. The detected error voltage arising tendency then permits a discrimination between a state close to the just tracking state and a state close to a state of deviation by a two track-pitch distance. In the case of this specific embodiment, the head position is regarded as close to the just tracking state when the tracking error voltage changes from a positive voltage to a negative voltage and as close to a state of deviating by a two track-pitch distance when the error voltage changes from negative to positive. In the latter case, the selecting rotation of the local pilot signals is changed by skipping some of them as applicable.

Referring again to FIG. 8, the pulses produced from the monostable multivibrator 108 as shown at the part (a)(iii) of FIG. 9 are converted into pulses as shown at a part (d) of FIG. 9 by another multivibrator 109. Then, the output of the monostable multivibrator 109 is changed into timing pulses as shown at a part (e) of FIG. 9 by the delay circuit 110. The pulse shown at the part (e) of FIG. 9 are used by two S/H circuits 111 and 112 for sampling and holding the output of the level comparison circuit 13 which is obtained on the basis of the signal reproduced by the FEH as shown at the part (b) of FIG. 9. The outputs of the S/H circuits 111 and 112 are supplied to the comparator 113. Under a normal tracking control condition, therefore, the S/H circuit 111 samples and holds a positive level signal during the first half of the period tFE of the output of the comparison circuit 13. The S/H circuit 112 samples and holds a negative level signal during the latter half of the same period. With the outputs of these S/H circuits supplied to the comparator 113, the level of the output of the circuit 106 which is supplied to the switching circuit 104 becomes high. In the event that the tracing position of the head is deviating by a two track-pitch distance from the recording track to be controlled, the S/H circuit 111 samples and holds a negative level signal during the first half of the output period tFE of the comparison circuit 13 and the other S/H circuit 112 a positive level signal during the latter half of the same period respectively. Therefore, the output of the comparator 113 is supplied at a low level to the switching circuit 104. The local pilot signal switching or selection circuit 104 is thus controlled only when the output level of the comparator 113 is low. Then, the circuit 104 operates, for example, to change the local pilot signal generating sequence by skipping two steps in such a way as to produce the local pilot signal of frequency f3 in place of frequency f1 and the local pilot signal of frequency f4 in place of frequency f2.

In the embodiment described, instability of tracking control is detected by using the pilot signals reproduced by the FEH which is arranged to travel in the same direction as the reproducing head and a reference signal which is used together with the output of the reproducing head for tracking control; and, upon detection of the instability, the sequence in which reference signals of different frequencies are generated in rotation in a stepwise manner is changed by skipping a given number of steps. The invented arrangement is therefore capable of bringing the tracking control into a stable state within a short period of time.

In the case of the embodiment described, the FEH is arranged to have its tracing position relative to other heads A and B as shown in FIG. 5. These relative positions may be changed. In that event, the circuit arrangement described also changes accordingly. For example, referring to FIG. 5, if the FEH is arranged to have its tracing position shifted rightward by a two track-pitch distance away from those of the heads A and B, the above-stated relation between the output tendency of the comparator 113 obtained when the heads A and B are nearly in the just tracking state and that of the comparator 113 obtained when the positions of these heads are deviating to an extent close to a two track-pitch distance inversely takes place.

What is claimed is:

1. An information signal recording and reproducing apparatus arranged to record in rotation pilot signals of a plurality of kinds having different frequencies in respective different recording tracks, along with an information signal on a recording medium and to reproduce said information signal from said recording medium, comprising:
   (a) a first rotary head arranged to reproduce said information signal;
   (b) a second rotary head arranged to erase said information signal on said recording medium;
   (c) reference signal generating means arranged to generate in rotation reference signals of a plurality of kinds having different frequencies corresponding to those of said pilot signals;
   (d) control means for controlling the relatie positions of said first rotary head and the recording medium by using said reference signals generated by said reference signal generating means and said pilot signals reproduced by said first rotary head; and
   (e) skipping means for causing said reference signal generating means to change the reference signal generating sequence thereof by skipping a given number of reference signals according to said pilot signals reproduced by said second rotary head.

2. An apparatus according to claim 1, wherein said skipping means includes first comparison means for comparing the levels of pilot signals of two different kinds included in said pilot signals which are reproduced by said second rotary head.

3. An apparatus according to claim 2, wherein said first comparison means includes a multiplying circuit which is arranged to perform a multiplying operation on said pilot signals reproduced by said second rotary head and said reference signal generated by said generating means; and a first comparison circuit which is arranged to compare the levels of signals of two predetermined different frequencies included in the output of said multiplying circuit.

4. An apparatus according to claim 2, wherein said skipping means further includes a second comparison means which is arranged to compare the outputs of said first comparison means produced at different points of time.

5. An apparatus according to claim 4, wherein said second comparison means is arranged to compare the outputs of said first comparison means produced at different points of time before and after said change of said reference signal generating sequence of said generating means from one kind over to another.

6. An apparatus according to claim 5, wherein said second comparison means includes a pair of sampling circuits which are arranged to sample the output signals of said first comparison means produced before and after said change-over of said reference signal generating sequence of said generating means from one kind to another; and a second comparison circuit which is arranged to compare the signals sampled by said pair of sampling circuits respectively.

7. An apparatus according to claim 2, further comprising supply means for selectively supplying said first comparison means with one of signals reproduced by said first and second rotary heads.

8. An apparatus according to claim 7, wherein said control means is arranged to control the relative positions of said first rotary head and said recording medium on the basis of the output of said first comparison means produced when the signal reproduced by said first rotary head is supplied by said supply means to said first comparison means.

9. An apparatus according to claim 8, wherein said supply means is arranged to supply the output of said second rotary head to said first comparison means only during predetermined periods before and after said reference signal generated by said generating means is changed from one of said plurality of kinds over to another while said second rotary head is tracing said recording medium.

10. An apparatus according to claim 9, wherein said first rotary head includes a pair of rotary heads; and said apparatus further comprises a switching circuit which is arranged to alternately produce signals reproduced by said pair of rotary heads by switching the output thereof from one of said reproduced signal over to another.

11. An apparatus according to claim 10, wherein the switching timing of said switching circuit is in synchronism with the timing at which said reference signal generated by said generating means is changed from one of said plurality of kinds over to another.

12. An information signal reproducing apparatus arranged to reproduce an information signal from a recording medium on which pilot signals of four kinds having different frequencies are recorded in rotation in respective different recording tracks along with said information signal, comprising:
   (a) head means including a reproducing head for reproducing said information signal from said recording medium and an erasing head for erasing said information signal recorded on said recording medium;
   (b) reference signal generating means arranged to generate in rotation reference signals of four kinds having difference frequencies corresponding to those of said pilot signals;

(c) tracking control means for controlling the relative positions of said reproducing head and the recording medium by using said reference signals generated by said reference signal generating means and said pilot signals reproduced by head means; and (d) skipping means for causing said reference signal generating means to change the reference signal generating sequence thereof by a given number of reference signals by using said pilot signals reproduced by said erasing head.

* * * * *